(12) United States Patent
Rexhepi et al.

(10) Patent No.: US 8,885,599 B2
(45) Date of Patent: Nov. 11, 2014

(54) HANDOVER OF CIRCUIT-SWITCHED CALL TO PACKET-SWITCHED CALL, AND VICE VERSA

(75) Inventors: Vlora Rexhepi, Ke Den Hoorn ZH (NL); Iuliana Marinescu, Espoo (FI); Guillaume Sebire, Espoo (FI)

(73) Assignee: Nokia Corporation, Espoo (FI)

( * ) Notice: Subject to any disclaimer, the term of this patent is extended or adjusted under 35 U.S.C. 154(b) by 1105 days.

(21) Appl. No.: 12/521,679

(22) PCT Filed: Dec. 28, 2007

(86) PCT No.: PCT/IB2007/004133
§ 371 (c)(1),
(2), (4) Date: Dec. 5, 2010

(87) PCT Pub. No.: WO2008/081310
PCT Pub. Date: Jul. 10, 2008

(65) Prior Publication Data
US 2011/0110326 A1    May 12, 2011

Related U.S. Application Data

(60) Provisional application No. 60/877,689, filed on Dec. 28, 2006.

(51) Int. Cl.
*H04W 4/00* (2009.01)
*H04W 36/00* (2009.01)

(52) U.S. Cl.
CPC .................................. *H04W 36/0022* (2013.01)
USPC ............................ 370/331; 370/252; 455/438

(58) Field of Classification Search
None
See application file for complete search history.

(56) References Cited

U.S. PATENT DOCUMENTS

2005/0243870 A1* 11/2005 Balogh et al. ................. 370/522
2006/0229101 A1* 10/2006 LaBauve et al. .............. 455/560

(Continued)

FOREIGN PATENT DOCUMENTS

EP        1182900 A    2/2002
WO   WO 2006/103547 A1   10/2006

OTHER PUBLICATIONS

3rd Generation Partnership Project, "Technical Specification Group Services and System Aspects", 3GPP TR 23.882, v1.4.2, Oct. 2006, 160 pages.

(Continued)

Primary Examiner — Mohammad Adhami
(74) Attorney, Agent, or Firm — Harrington & Smith (57) ABSTRACT

A method includes, during an ongoing call of a wireless user terminal in one of a circuit switched domain or a packet switched domain, initiating a handover procedure; setting parameters allowing the other domain to determine the actual resources needed to continue the call in the other domain, sending an indication of these parameters towards a network element of the other domain and completing the handover procedure. When the ongoing call is in the circuit switched domain completing the handover procedure results in handing over the ongoing call to the packet switched domain, and when the ongoing call is in the packet switched domain completing the handover procedure results in handing over the ongoing call to the circuit switched domain. For example, the circuit switched domain may be a GERAN network and the packet switched domain may be an E-UTRAN (LTE) network. In the GERAN network the handover procedure may be accomplished at least in part through a Gs interface between a mobile switching center and a serving general packet radio system support node and/or through a Gb interface between a base station system and the serving general packet radio system support node. The handover procedure is accomplished at least in part by signaling conducted over an S3 interface between the serving general packet radio system support node of the GERAN network and the mobility management entity of the E-UTRAN network.

12 Claims, 9 Drawing Sheets (56) References Cited

U.S. PATENT DOCUMENTS

| | | | |
|---|---|---|---|
| 2006/0281459 A1 | 12/2006 | Marinescu et al. | 455/436 |
| 2007/0058791 A1 | 3/2007 | Liu et al. | 379/88.17 |
| 2007/0149196 A1* | 6/2007 | Choi et al. | 455/436 |
| 2007/0237126 A1* | 10/2007 | Pirila et al. | 370/349 |
| 2008/0076386 A1* | 3/2008 | Khetawat et al. | 455/410 |
| 2008/0095362 A1* | 4/2008 | Blom et al. | 380/45 |
| 2008/0130578 A1* | 6/2008 | Wang et al. | 370/331 |

OTHER PUBLICATIONS

International Search Report and Written Opinion received in corresponding Patent Cooperation Treaty Application No. PCT/IB2007/004133, Jun. 3, 2008, 6 pages.

Office Action received in corresponding Chinese Application No. 200780048560.2, Jun. 24, 2011, 16 pages.

Office Action received in corresponding Korean Application No. 2009-7015907, Jan. 14, 2010, 3 pages.

Office Action received in corresponding Korean Application No. 2009-7015907, Jan. 23, 2011, 2 pages.

3GPP TR 25.913 V7.3.0 (Mar. 2006), Technical Specification Group Radio Access Network; Requirements for Evolved UTRA (E-UTRA) and Evolved UTRAN (E-UTRAN) (Release 7).

3GPP TS 36.300 V8.2.0 (Sep. 2007), Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Rexhepi, V., et al., "Handover of Packet-Switched Services in GERAN A/Gb Mode", Nokia, Helsinki, Finland, Global Telecommunications Conference 2005.

TSG-SA WG 1 (Services) meeting #6, San Diego, Nov. 29-Dec. 3, 1999, TSG S1#6(99)894; Agenda ite: All-IP ad-hoc; Agenda Item: 7.1 Handover Scenarios for "all-IP" Network in release 2000.

3GPP TS 43.129 V7.0.0 (Nov. 2006), Technical Specification Group GSM/EDGE Radio Access Network; Packet-Switched Handover for GERAN A/Gb mode State 2 (Release 7).

Neeser, F., "Intersystem Handover Simulation, White Paper", WPIHOSFN2.1 May 26, 2005, Nexus Telecom AG, Switzerland.

\* cited by examiner

HANDOVER OF CIRCUIT-SWITCHED CALL TO PACKET-SWITCHED CALL, AND VICE VERSA

RELATED APPLICATION

This application was originally filed as PCT Application No. PCT/IB2007/04133 filed Dec. 28, 2007 and claims priority to U.S. Application No. 60/877,689 filed on Dec. 28, 2006.

TECHNICAL FIELD

The exemplary and non-limiting embodiments of this invention relate generally to wireless communication systems, methods, devices and computer program products and, more specifically, relate to techniques to perform an inter-radio access technology handover of a call.

BACKGROUND

Various abbreviations that appear in the following description and in the Figures are defines as follows:
3GPP third generation partnership project
BSC base station controller
BSS base station system
BSSGP base station system GPRS protocol
CN core network
CS circuit switched
DRX discontinuous reception
DTM dual transfer mode
DTX discontinuous transmission
EDGE enhanced data rates for global evolution
E-UTRAN evolved UMTS terrestrial radio access network
GANC generic access network controller
GERAN GSM EDGE radio access network
GPRS general packet radio service
GSM global system for mobile communications
Gb interface between GERAN and SGSN
Gs interface between MSC and SGSN
HO handover
IMS IP multimedia subsystem
LTE long term evolution
MAC medium access control
MM mobility management
MS mobile station (e.g., a GERAN terminal)
MSC mobile switching center
MME mobility management entity
MS mobile station
Node-B base station
eNB evolved Node-B
PS packet switched
QoS quality of service
RAN radio access network
RAT radio access technology
RLC radio link control
RNC radio network controller
SGSN serving GPRS support node
UE user equipment (e.g., an E-UTRAN terminal)
UMTS universal mobile telecommunications system
UPE user plane entity
VoIP voice over internet protocol
WCDMA wideband code division multiple access As a general and non-limiting definition, a circuit switched network is one in which a physical path is obtained for and dedicated to a single connection between two end-points in the network for the duration of the connection. In contrast, a packet switched network is one in which relatively small units of data, referred to as packets, are routed through the network based on a destination address contained within each packet. The use of packets enables the same data path to be shared among a plurality of users in the packet switched network.

In 3GPP the specification of the LTE (E-UTRAN) is ongoing. There is a requirement to provide transitions between GERAN and E-UTRAN in order to maintain seamless mobility across different technologies. There are two characteristics of E-UTRAN that should be taken into account for the development of adequate inter-working solutions: support of packet data only exists in E-UTRAN, i.e., only the PS domain (not the CS domain) is available; and higher QoS requirements in E-UTRAN as compared to what is offered in the other 3GPP systems (e.g., WCDMA, GSM/GPRS/EDGE).

The 3GPP E-UTRAN Inter-RAT handover requirements are specified in 3GPP TS25.913, V7.3.0 (2006-03), 3rd Generation Partnership Project; Technical Specification Group Radio Access Network; Requirements for Evolved UTRA (E-UTRA) and Evolved UTRAN (E-UTRAN) (Release 7), incorporated by reference herein. The main requirements applicable to GERAN/E-UTRAN inter-working are: inter-working with GERAN/UTRAN should be supported; the UE/MS performs inter-RAT neighbor cell measurements during DRX idle periods that are provided by the network through suitable DRX/DTX periods or packet scheduling if necessary; and the maximum service interruption time (E-UTRAN to GERAN/UTRAN) is less then 300 ms for real-time (RT) services, and less then 500 ms for non real-time (NRT) services.

These requirements apply both to terminals (user equipment and mobile stations) and GERAN networks that provide support for E-UTRAN handovers.

Thus, supporting HOs between GERAN and E-UTRAN, and vice versa, with minimum service interruption is an important requirement. In particular, the handover of voice services is critical due to the required domain switch from CS to PS.

Handover of a CS voice call to an E-UTRAN VoIP call (a PS domain call), and vice versa, may be a most challenging case, seeing that there is no CS domain in E-UTRAN, and there are no interfaces to the CS domain, at least as presently envisioned in E-UTRAN 3GPP specifications and technical reports.

The problem that is thus presented is how to perform a handover of CS voice call to a VoIP call from GERAN to E-UTRAN, and vice versa, in a seamless manner as perceived by the user, without service interruption and without quality degradation. Furthermore, considering that currently deployed GERAN networks do not support PS handover, this problem becomes even more challenging.

It is noted that procedures utilizing Voice Call Continuity (VCC) from E-UTRAN to 2G/3G have been discussed as part of single radio VCC solutions, as in 3GPP TR 23.882 V.1.4.2 (2006-10), 3rd Generation Partnership Project; Technical Specification Group Services and System Aspects; 3GPP System Architecture Evolution: Report on Technical Options and Conclusions (Release 7), incorporated by reference herein.

Reference may also be made to the following documents, which may be generally related to the problems discussed above:

"Handover of packet-switched services in GERAN A/Gb mode"; Rexhepi, V., Bohaty, Hamiti, S. Sébire, G.; Nokia, Helsinki, Finland; Global Telecommunications Conference, 2005. GLOBECOM '05. IEEE; Publication Date: 28 Nov.-2 Dec. 2005, Volume: 5;

"Intersystem Handover Simulation, White Paper", WPI-HOSFN2.1, 26 May 2005, F. Neeser, Nexus Telecom AG, Switzerland;

TSG-SA WG 1 (Services) meeting #6, TSG S1#6(99) 894, San Diego, 29 Nov.-3 Dec. 1999, Agenda Item: All-IP ad-hoc, Agenda Item: 7.1, Source: Orange PCS Ltd, Subject: Handover scenarios for "all-IP" network in release 2000;

US 2006/0281459 A1, Dec. 14, 2006, Marinescu et al., "Utilizing a Same Target Cell During Circuit-Switched and Packet-Switched Handover", Nokia Corporation;

US 2007/0058791 A1, Mar. 15, 2007, Liu et al.; "Method for Handoff from Packet Switching Domain to Circuit Switching Domain and Equipment Thereof", Huawei Technologies Co., Ltd.; and WO 2006/103547 A1, Publication Date: Oct. 5, 2006; "Combined Handover of the Circuit-Switched (CS) and Packet-Switched (PS) Resources", Marinescu et al., Nokia Corporation.

For example, the above-referenced US 2007/0058791 A1 discloses a method for handoff from a PS domain to a CS domain that includes the MS obtaining a handoff number and initiating a CS domain session request by taking the handoff number as a called number; a network side associating the CS domain session request to an original session of the MS and notifying the MS to finish an air interface handoff; the MS notifying the network side to finish a network side handoff.

SUMMARY OF THE EXEMPLARY EMBODIMENTS OF THE INVENTION

In a first aspect thereof the exemplary embodiments of this invention provide a method that includes, during an ongoing call of a wireless user terminal in one of a circuit switched domain or a packet switched domain, initiating a handover procedure; setting parameters allowing the other domain to determine the actual resources needed to continue the call in said other domain, and sending an indication of these parameters towards a network element of said other domain; and completing the handover procedure. When the ongoing call is in the circuit switched domain completing the handover procedure results in handing over the ongoing call to the packet switched domain, and when the ongoing call is in the packet switched domain completing the handover procedure results in handing over the ongoing call to the circuit switched domain.

In another aspect thereof the exemplary embodiments of this invention provide a computer-readable medium that stores computer program instructions the execution of which results in operations that comprise, during an ongoing call of a wireless user terminal in one of a circuit switched domain or a packet switched domain, initiating a handover procedure; setting parameters allowing the other domain to determine the actual resources needed to continue the call in said other domain, and sending an indication of these parameters towards a network element of said other domain and completing the handover procedure, where when the ongoing call is in the circuit switched domain completing the handover procedure results in handing over the ongoing call to the packet switched domain, and when the ongoing call is in the packet switched domain completing the handover procedure results in handing over the ongoing call to the circuit switched domain.

In a further aspect thereof the exemplary embodiments of this invention provide an apparatus that includes a controller configurable for operation during an ongoing call of a wireless user terminal in one of a circuit switched domain or a packet switched domain to initiate a handover procedure and to set parameters allowing the other domain to determine the actual resources needed to continue the call in said other domain. The apparatus further includes an interface configurable to send an indication of these parameters towards a network element of said other domain. Where when the ongoing call is in the circuit switched domain completing the handover procedure results in handing over the ongoing call to the packet switched domain, and when the ongoing call is in the packet switched domain completing the handover procedure results in handing over the ongoing call to the circuit switched domain.

In a still further aspect thereof the exemplary embodiments of this invention provide an apparatus that includes means, responsive to an ongoing call of a wireless user terminal in one of a circuit switched domain or a packet switched domain, for initiating a handover procedure; means for setting parameters allowing the other domain to determine the actual resources needed to continue the call in said other domain, and for sending an indication of these parameters towards a network element of said other domain; and means for completing the handover procedure. When the ongoing call is in the circuit switched domain completing the handover procedure results in handing over the ongoing call to the packet switched domain, and when the ongoing call is in the packet switched domain completing the handover procedure results in handing over the ongoing call to the circuit switched domain.

DETAILED DESCRIPTION

The exemplary embodiments of this invention provide several methods, apparatus and computer program products to perform an inter-RAT handover of a GERAN CS call to an E-UTRAN VoIP call, and vice versa, utilizing at least in part a circuit-switched handover.

The exemplary embodiments of this invention provide solutions to the problems discussed above, and focus on (but are not limited to) intra-3GPP inter-working mobility aspects during the connected mode in GERAN and E-UTRAN, utilizing GERAN legacy procedures.

The exemplary embodiments of this invention provide methods, apparatus and computer program products to handover a CS voice call from GERAN to a PS VoIP call in E-UTRAN, and vice versa, utilizing the CS handover procedures in GERAN and call initiation in E-UTRAN for the inter-RAT handover from GERAN to LTE. The exemplary embodiments may be based on the GERAN architecture. Reference can be made to 3GPP TS43.129, V7.0.0 (2006-11), 3rd Generation Partnership Project; Technical Specification Group GSM/EDGE Radio Access Network; Packet-switched handover for GERAN A/Gb mode; Stage 2 (Release 7), incorporated by reference herein.

Figure 3A:
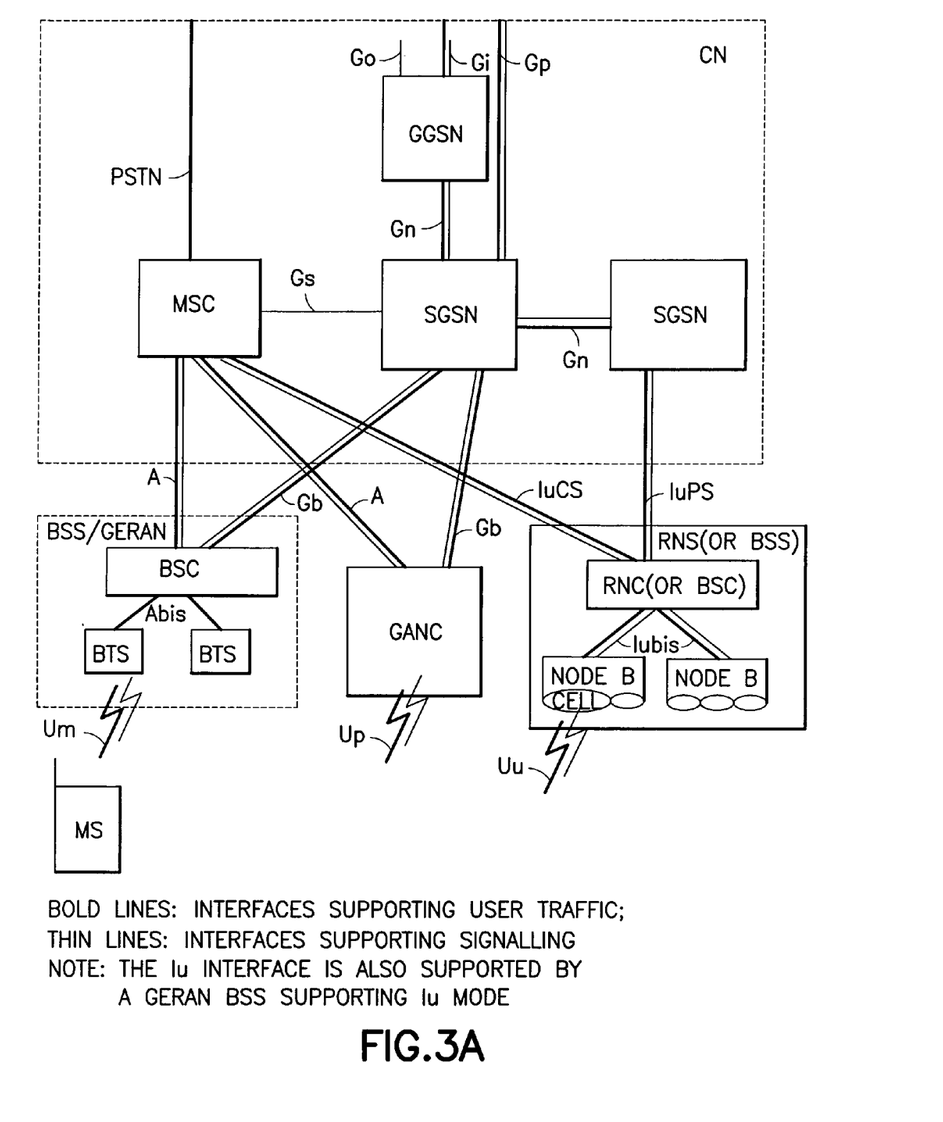
FIG. 3A reproduces FIG. 1 from 3GPP TR 43.129, and depicts the reference architecture for PS handover in GERAN A/Gb mode.

FIG. 3A reproduces FIG. 1 from 3GPP TR 43.129, and depicts the reference architecture for PS handover in GERAN A/Gb mode. This Figure shows the various interfaces between the MSC, SGSN, GGSN, BSC, RNC, GANC and the MS, including the Gs (MSC-SGSN), Gb (SGSN-BSC), Gn (SGSN-SGSN), as well as Urn, Up and Uu interfaces.

Also of interest is 3GPP TS 36.300, V8.2.0 (2007-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), incorporated by reference herein.

Figure 3B:
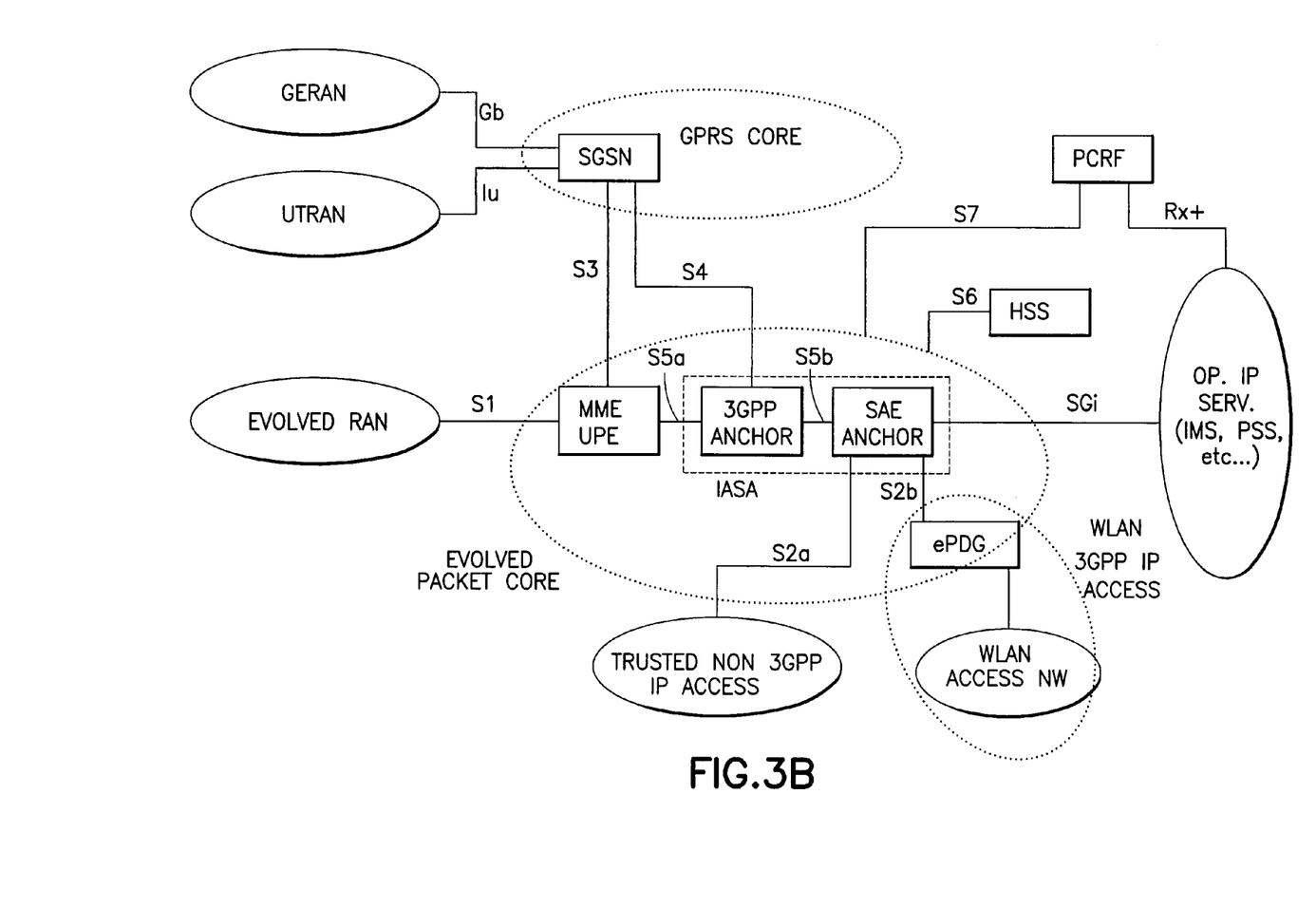
FIG. 3B reproduces FIG. 4.2-1 from 3GPP TR23.882, and depicts the logical high level architecture for the evolved system (E-UTRAN, LTE).
Figure 3C:
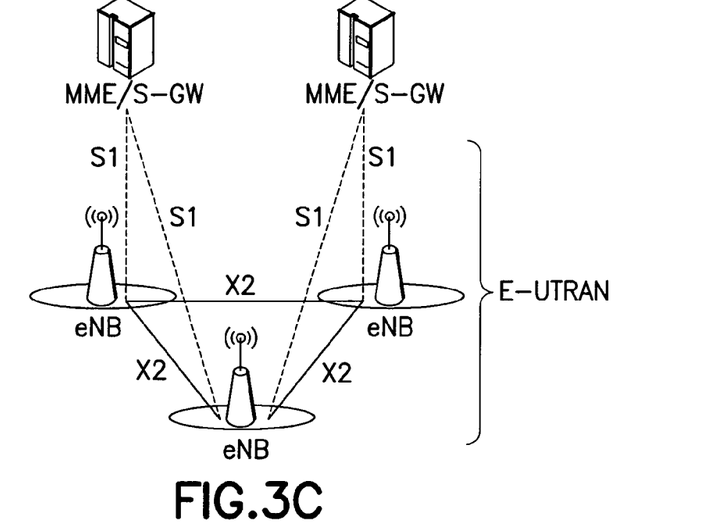
FIG. 3C reproduces FIG. 4 of 3GPP TS 36.300, and shows the overall architecture of the E-UTRAN system.

FIG. 3C reproduces FIG. 4 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC (Evolved Packet Core), more specifically to a MME (Mobility Management Entity) by means of a S1-MME interface and to a Serving Gateway (S-GW) by means of a S1-U interface. The S1 interface supports a many-to-many relation between MMEs/Serving Gateways and eNBs.

Figure 3D:
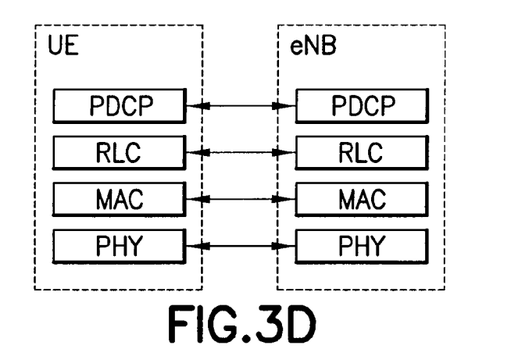
FIG. 3D reproduces FIG. 4.3.1 of 3GPP TS 36.300, and shows the E-UTRAN user-plane protocol stack.
Figure 3E:
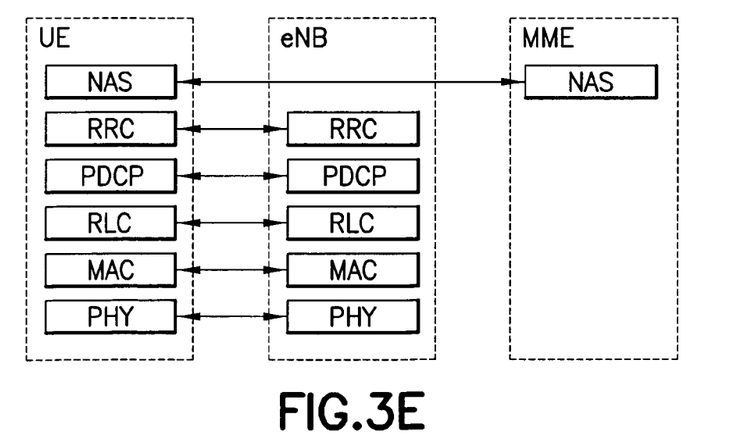
FIG. 3E reproduces FIG. 4.3.2 of 3GPP TS 36.300, and shows the E-UTRAN control-plane protocol stack.

FIG. 3D reproduces FIG. 4.3.1 of 3GPP TS 36.300, and shows the E-UTRAN user-plane protocol stack, while FIG. 3E reproduces FIG. 4.3.2 of 3GPP TS 36.300, and shows the E-UTRAN control-plane protocol stack.

Figure 3F:
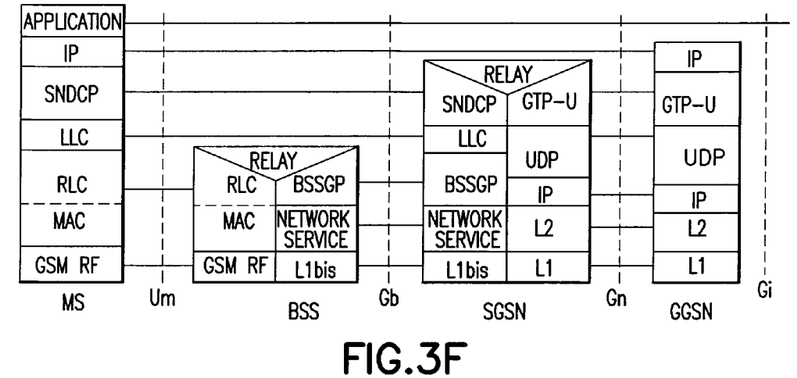
FIG. 3F reproduces FIG. 2 from 3GPP TR 43.129, and depicts the user plane protocol architecture in A/Gb mode.
Figure 3G:
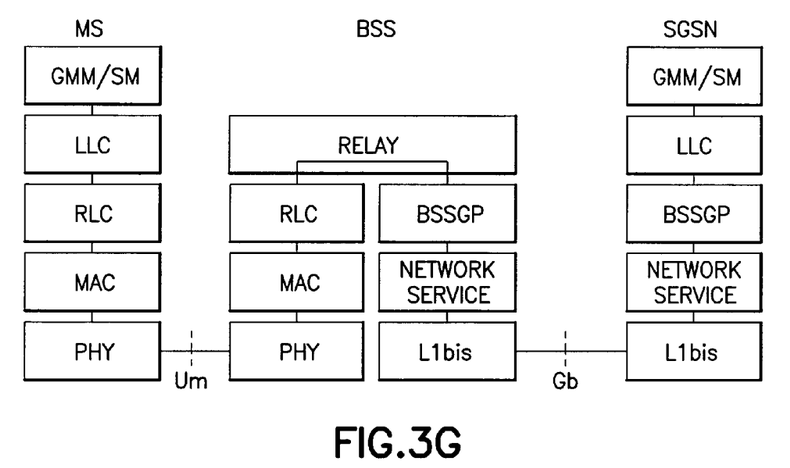
FIG. 3G reproduces FIG. 3 from 3GPP TR 43.129, and depicts the control plane architecture in A/Gb mode.

For completeness, reference may also be made to FIG. 3F, which reproduces FIG. 2 from 3GPP TR 43.129 and depicts the user plane protocol architecture in A/Gb mode, and to FIG. 3G, which reproduces FIG. 3 from 3GPP TR 43.129 and depicts the control plane architecture in the A/Gb mode.

In order to support seamless handover of a CS voice call to a VoIP (PS domain) call in E-UTRAN there is a need to operate both a RAT change (inferred by a change from GERAN to E-UTRAN), and a domain change from the CS domain to the PS domain.

Conversely, in order to support seamless handover of a VoIP (PS domain) voice call in E-UTRAN to a CS voice call in GERAN there is a need to operate both a RAT change (inferred by a change from E-UTRAN to GERAN), and a domain change from the PS domain to the CS domain.

The exemplary embodiments of this invention address and solve the problems inherent in a handover of a GERAN CS call to E-UTRAN VoIP call, where a goal is to minimize service interruption by utilizing CS handover and BSSGP procedures in GERAN, and call initiation and PS handover procedures in E-UTRAN. Another goal is to provide for the HO of the E-UTRAN VoIP call to the GERAN CS call by utilizing PS handover/relocation procedures in E-UTRAN and the call initiation procedures in GERAN.

For the purposes of this description the BSSGP may be assumed to be supported across the Gb interface (see FIGS. 3A, 3B and 3F), and its primary functions include the provision by the SGSN to the BSS of radio related information used by the RLC and MAC functions, and the provision by the BSS to the SGSN of radio related information derived from the RLC/MAC function. An additional functionality of the BSSGP is to enable two physically distinct nodes, the SGSN and the BSS, to operate node management control functions.

The specific procedure to be followed is dependent at least in part on whether the Gs interface is supported (MSC-SGSN, see FIG. 3A). A first embodiment may be referred to as a partial handover via the Gs interface (BSS, MSC=>SGSN=>EPC (enhanced packet core)=>E-UTRAN; E-UTRAN=>EPC=>SGSN=>MSC=>BSS), when the Gs interface is available to be used. A second embodiment may be referred to as a resource allocation request via the Gb Interface ((BSS, SGSN=>EPC=>E-UTRAN; E-UTRAN=>EPC=>SGSN=>BSS=>MSC), when the Gs interface is not available. A high level procedure of the basic steps to execute these methods is described below for each of these two embodiments with reference to FIGS. 1A, 1B, 2A and 2B. Note in FIGS. 1A, 1B, 2A and 2B that S1 indicates the interface between the evolved RAN (eNB 14) and the MME/UPE 20, and S3 indicates the interface between SGSN 18 of the GPRS core and the MME/UPE 20 (see FIG. 3B).

As is defined in 3GPP TR23.882, such as in section 4.2 and in FIG. 4.2-1, reproduced herein as FIG. 3B, S1 provides access to Evolved RAN radio resources for the transport of user plane and control plane traffic. The S1 reference point enables MME and UPE separation and also deployments of a combined MME and UPE solution. S3 enables user and bearer information exchange for inter-3GPP access system mobility in the idle and/or active state. It is based on the Gn reference point as defined between SGSNs (see FIG. 3A).

Figure 4A:
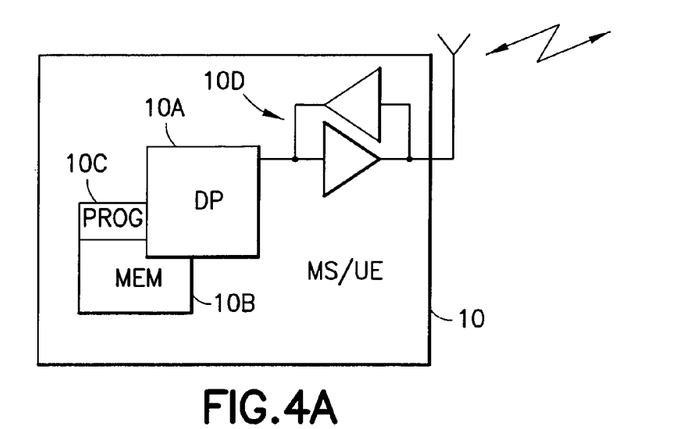
FIGS. 4A, 4B and 4C show simplified block diagrams of various electronic devices that are suitable for use in practicing the exemplary embodiments of this invention.
Figure 4B:
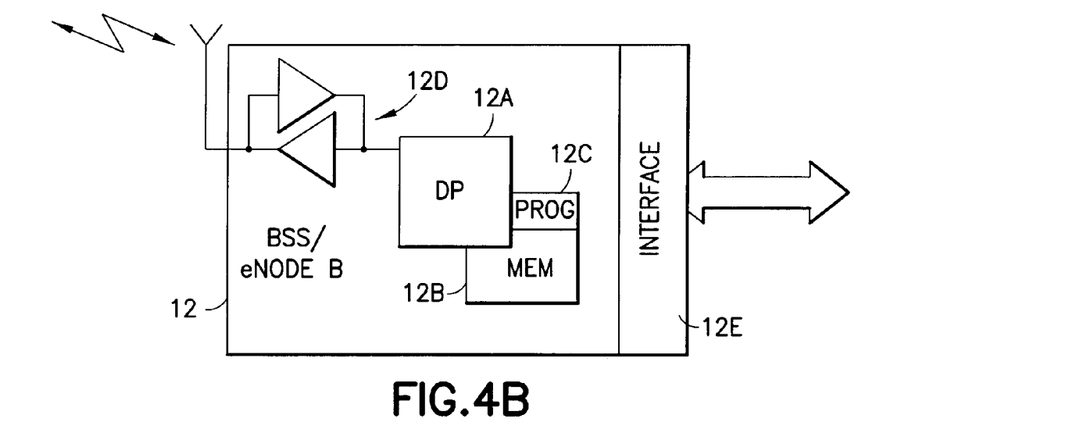
Figure 4C:
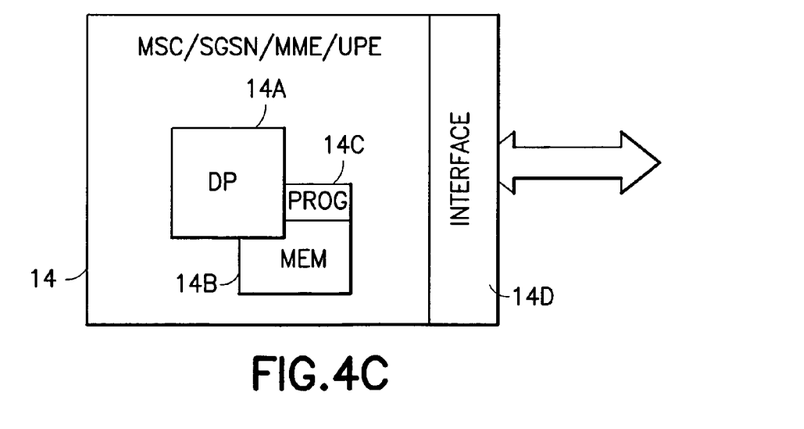

Note that the various message flows and executed functions shown in FIGS. 1A, 1B, 2A and 2B may also be viewed as method steps, and/or as operations that result from operation of computer program code 10C, 12C, 14C stored in computer-readable medium, such as the memories 10B, 12B and 14B shown in FIGS. 4A-4C.

Note further that some of the message names may be changed from those specifically used below. It should be further noted, at present, the EPC, E-UTRAN system is not completely defined and specified, and that at least some items may still be reserved for future study. Thus, changes in any mentioned EPC, E-UTRAN-related functions, nodes, interfaces and message types may occur.

Embodiment 1

Partial HO Via Gs Interface

Inter-RAT Handover GERAN to E-UTRAN

Figure 1A:
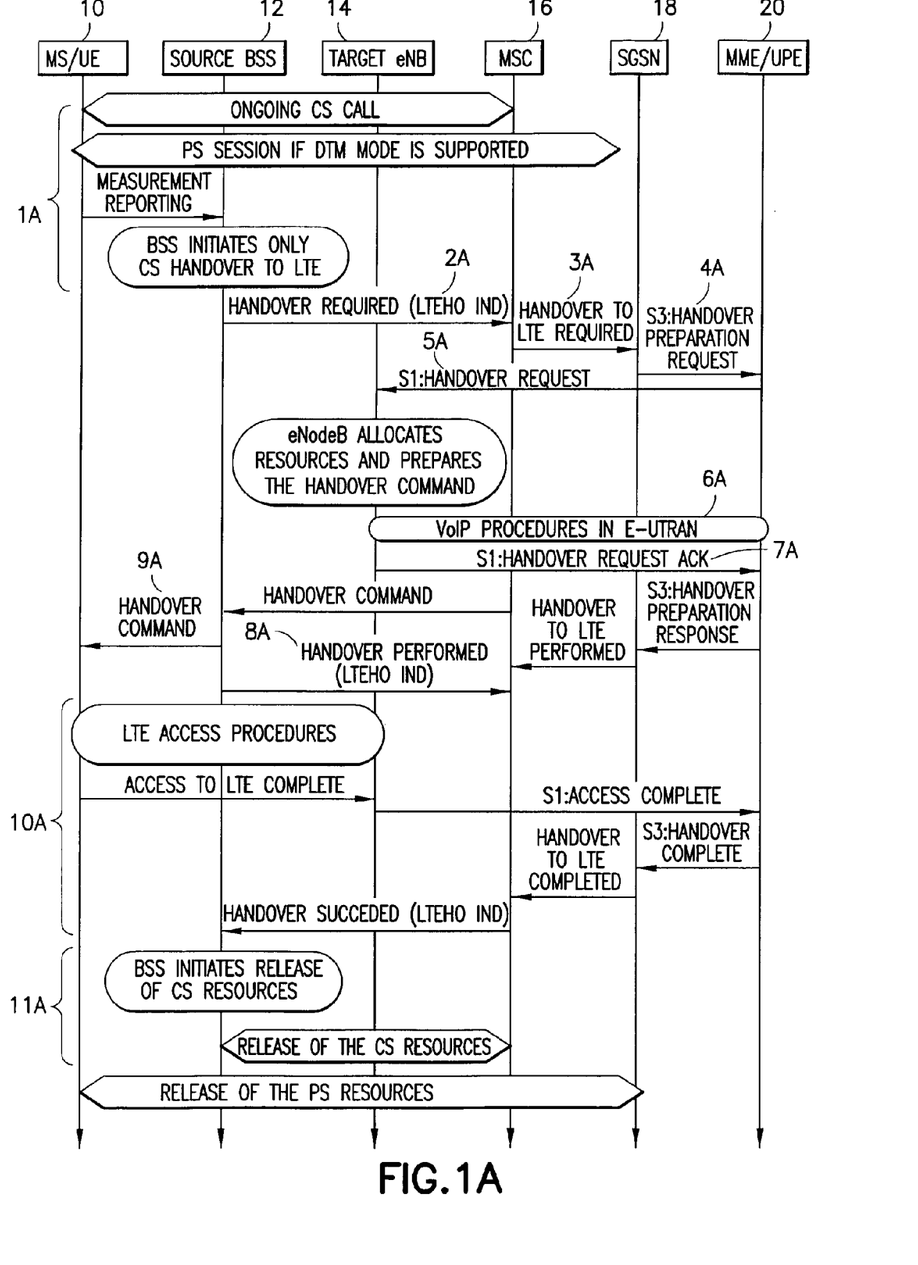
FIG. 1A presents an example of the signaling flow for a HO of a CS call to a PS call (e.g., a VoIP call) in accordance with a first exemplary embodiment that uses the Gs interface (MSC-SGSN), where the various signaling messages should be seen as illustrative.

Referring to FIG. 1A, the signaling path for this embodiment is from the BSS 12 through the MSC 16 and SGSN 18 and MME/UPE 20 towards E-UTRAN. The signaling steps are as follows:

1A. The (serving or source) BSS 12 sets parameters allowing the other domain (E-UTRAN) to determine the actual resources needed to continue the ongoing CS call in the other domain, and sends an indication of these parameters towards a network element of the other domain. The parameters may be set based on, for example, parameters associated with a GSM codec. Alternatively, default parameters may be used.

2A. The BSS 12 initiates the CS handover to the MSC 16 with an indicator that this is a handover to E-UTRAN. Note that a new signaling procedure may be defined for this purpose.

3A. The MSC 16 performs signaling to the SGSN 18 through the Gs interface. Note that a new signaling procedure is defined over the Gs interface for the purpose of the handover.

4A. The 2G (second generation) SGSN 18 (note that this SGSN may also be a 3G SGSN, and thus it may be appropriate to refer to simply a "SGSN", or to a 2G/3G SGSN, depending on the SGSN product types available) performs the "handover"-resource allocation request towards the MME/UPE 20 using the S3 interface (shown in FIG. 3B).

5A. A HO Request is sent from the MME/UPE 20 to the target eNB 14 (LTE Node-B) over the S1 interface (see FIGS. 3B and 3C), and in response the target eNB 14 allocates resources and prepares the HO Command. A HO Request ACK is subsequently sent via the S1 interface (7A).

6A. VoIP procedures are initiated in E-UTRAN.

7A. The HO Request Acknowledge is sent from the target eNB 14 to the MME/UPE 20 over the S1 interface.

8A. The allocated resources are propagated back to the MS/UE 10 via the SGSN 18 and BSS 12. This involves a HO Preparation Response sent visa the S3 interface from the MME/UPE 20 to the SGSN 18.

9A. The MS 10 receives an indication of the allocated (E-UTRAN (LTE)) resources as part of a HANDOVER COMMAND.

10A. The MS 10 moves to E-UTRAN on the allocated channel and continues the call using VoIP (PS domain) in accordance with the allocated LTE resources.

It can be noted at this point that the MSC 16 sends and indication to the source BSS 12 that the HO to LTE is successful.

11A. The MSC 16 releases the CS call upon successful access of the MS 10 in the E-UTRAN cell.

The preliminary conditions for this embodiment include:

availability of the Gs interface between the MSC 16 and the SGSN 18;

the MS 10 is GPRS attached, or MM information is exchanged between the SGSN 18 and the MSC 16; and the MS 10 is capable of supporting the path/domain switch.

Embodiment 1

Partial HO Via Gs Interface (Cont.)

Inter-RAT Handover E-UTRAN to GERAN

Figure 1B:
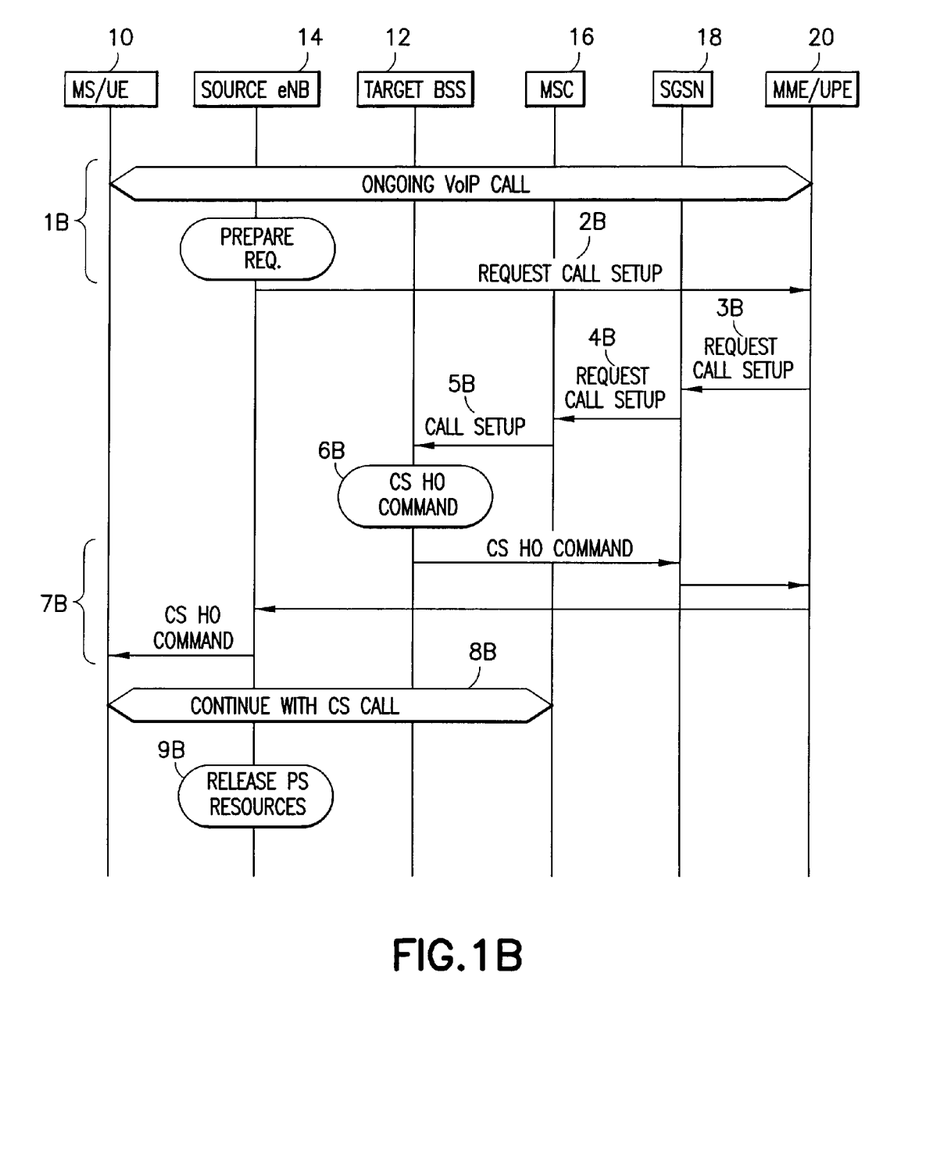
FIG. 1B presents an example of the signaling flow for a HO of a PS call to a CS call in accordance with the first exemplary embodiment, where the various signaling messages should be seen as illustrative.

The signaling path for this embodiment is from E-UTRAN through the MME/UPE 20, SGSN 18, MSC 16 towards the BSS 12. Referring to FIG. 1B, the signaling steps are as follows:

1B. The (source) eNodeB sets parameters allowing the other domain (GERAN) to determine the actual resources needed to continue the ongoing VoIP call in the other domain, and sends an indication of these parameters towards a network element of the other domain. The parameters may be set based on, for example, parameters associated with a VoIP codec indicating the resources needed in the CS domain, or default parameters can be used.

2B. The eNodeB 14 (e.g., based on a measurement report (GSM cell in the neighborhood) initiates a request via the S1 interface to the MME/UPE 20 to prepare call setup at the GSM cell between the (target) BSS 12 and the MSC 16 prior to handover.

3B. The MME/UPE 20 propagates the call setup request to the SGSN 18 via the S3 interface.

4B. The SGSN 18 informs the MSC 16 via the Gs interface of the call setup request received from the E-UTRAN.

5B. The MSC 16 initiates call setup signaling with the target BSS 12 (and the HLR/VLR) such that it is ready for use when the MS 10 accesses the GSM cell.

6B. The target BSS 12 prepares a CS Handover Command upon successful call setup.

7B. The CS Handover Command is sent to the MS 10 via the SGSN 18 and the E-UTRAN CN and RAN nodes (i.e., through the source eNB 14).

8B. The MS 10 moves to GERAN, and switches to the CS domain on an allocated dedicated physical channel and continues with the voice call in a CS manner.

9B. The eNodeB terminates the VoIP call in E-UTRAN upon successful MS access in the (GERAN) target cell.

Embodiment 2

Resource Allocation Request Via Gb Interface

Inter-RAT Handover GERAN to E-UTRAN

Figure 2A:
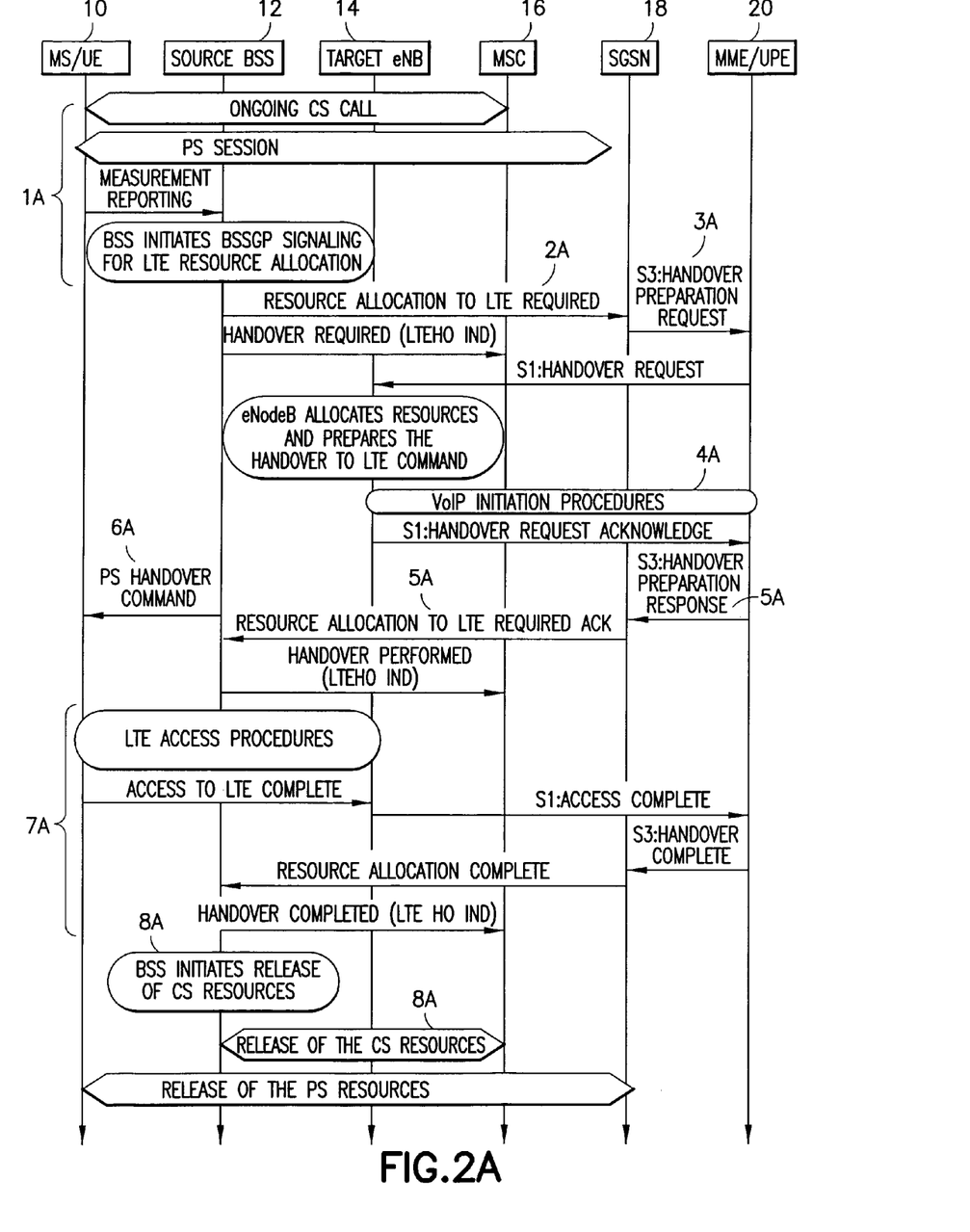
FIG. 2A presents an example of the signaling flow for a HO of a CS call to a PS call (e.g., a VoIP call) in accordance with a second exemplary embodiment that uses the Gb interface (BSS-SGSN), where the various signaling messages should be seen as illustrative.

Referring to FIG. 2A, the signaling path for this embodiment is from the BSS 12 through the SGSN 18 and MME/UPE 20 towards E-UTRAN. The signaling steps are as follows:

1A. The (serving or source) BSS 12 sets parameters allowing the other domain (E-UTRAN) to determine the actual resources needed to continue the ongoing CS call in the other domain. The parameters may be set based on, for example, parameters associated with a GSM codec indicating the VoIP resources needed in E-UTRAN. Alternatively, default parameters can be used.

2A. The BSS 12 utilizes BSSGP signaling (or other signaling that may be defined) to indicate that there is a need to prepare the resource allocation for the ongoing CS call in E-UTRAN, thereby sending an indication of these parameters towards a network element of the other domain.

3A. The SGSN 18 performs a "handover"—resource allocation request towards the MME/UPE 20 using the S3 interface. A HO required (LTE) HO Indication is also sent from the source BSS 12 to the MSC 16, and a HO Request is sent from the MME/UPE 20 to the target eNB 14 on the S1 interface. In response, the eNB 14 allocates LTE resources and prepares a HO to LTE command.

4A. VoIP procedures are initiated in E-UTRAN, and a HO Request Acknowledge is sent from the target eNB 14 back to the MME/UPE 20 on the S1 interface.

5A. The allocated resources are propagated back to the MS 10 via the SGSN 18.

6A. The MS 10 receives the allocated resources as part of a HANDOVER COMMAND (a PS HANDOVER COMMAND according to FIG. 2A).

7A. The MS 10 moves to E-UTRAN on the allocated channel and continues the call with VoIP (PS domain).

IM: The BSS 12 indicates the successful of the handover to LTE to MSC16.

8A. The BSS 12 and the MSC 16 release the CS call upon successful access of the MS 10 in the E-UTRAN cell.

The preliminary conditions for this embodiment are assumed to be as follows: the MS 10 is GPRS attached, or MM information is exchanged between the SGSN 18 and the MSC 16; and the MS 10 is capable of supporting the path/domain switch.

Embodiment 2

Resource Allocation Request Via Gb Interface
(Cont.)

Inter-RAT Handover E-UTRAN to GERAN

Figure 2B:
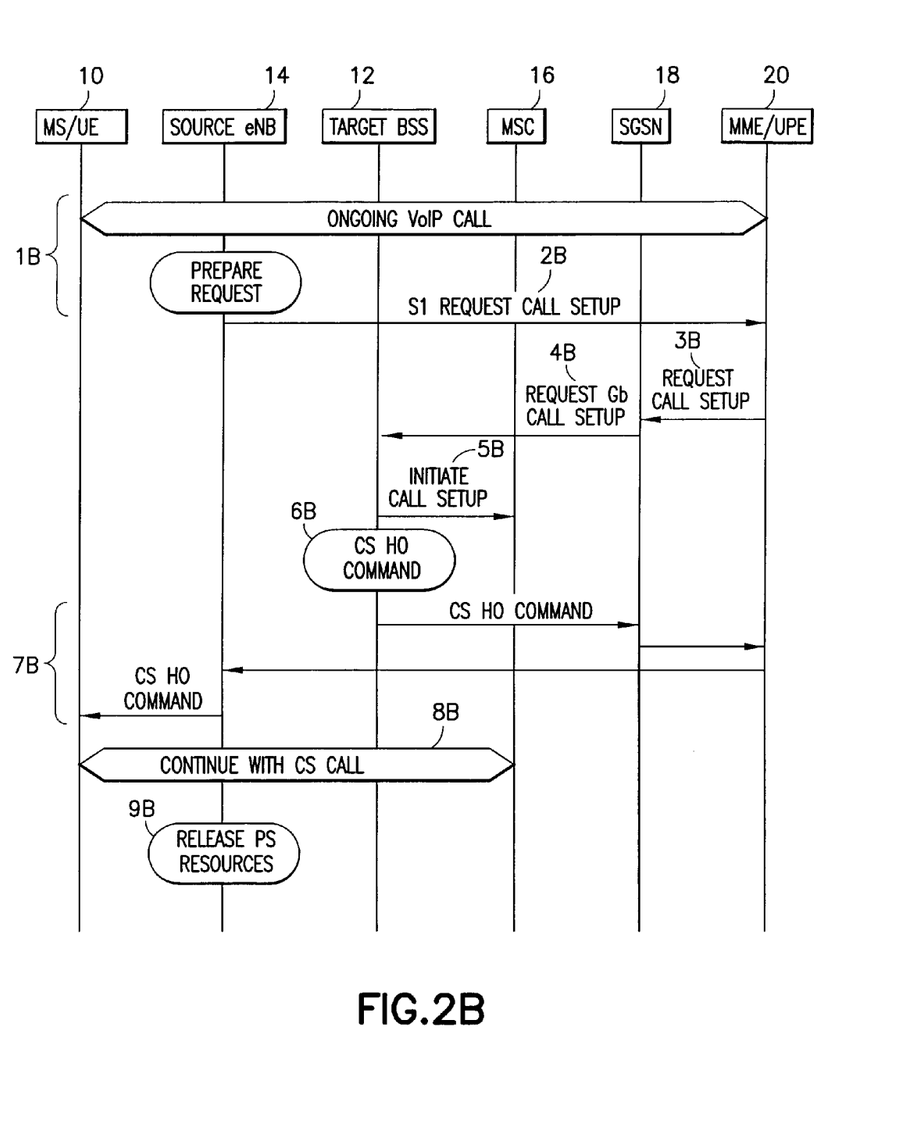
FIG. 2B presents an example of the signaling flow for a HO of a PS call to a CS call in accordance with the second exemplary embodiment, where the various signaling messages should be seen as illustrative.

The signaling path for this embodiment is from the E-UTRAN through the MME/UPE 20, SGSN 18 towards the BSS 12, MSC 16. Referring to FIG. 2B, the signaling steps are as follows:

1B. The (source) eNodeB 14 sets parameters allowing the other domain (GERAN) to determine the actual resources needed to continue the ongoing VoIP call in the other domain. The parameters may be set based on, for example, parameters associated with a VoIP codec indicating the resources needed in the CS domain, or default parameters can be used.

2B The eNodeB 14 (e.g. based on a measurement report (GSM cell in the neighborhood)) initiates a request over the S1 interface to the MME/UPE 20 to prepare call setup at the GSM between the (target) BSS 12 and the MSC 16 prior to handover, and thereby sends an indication of these parameters towards a network element of the other domain.

3B. The MME/UPE 20 propagates the request to the 2G SGSN 18.

4B. The SGSN 18 utilizes the BSSGP signaling (or other signaling may be defined) to indicate that there is a need to prepare the CS resource allocation for the ongoing VoIP call in E-UTRAN.

5B. The BSS 12 initiates call setup procedures towards the MSC 16.

6B. The BSS 12 prepares the CS Handover Command upon successful call setup.

7B. The CS Handover Command is sent to the MS 10 through the SGSN 18 and E-UTRAN CN and RAN nodes.

8B. The MS 10 moves to GERAN and switches to the CS domain on the allocated dedicated physical channel and continues with the CS voice call.

9B. The eNodeB terminates the VoIP call in E-UTRAN upon successful MS 10 access in the target cell.

Applicable to the foregoing embodiments, and when there is a DTM support in the GERAN network, utilizing the same procedures then also the PS resources may be indicated in the signaling.

Note that any needed IMS procedures have not been taken into account in the foregoing signaling steps, as they would be considered as part of the VoIP call control procedures in E-UTRAN.

The radio resources that are determined by the BSS 12 and eNB 14 in the embodiments discussed above correspond to those resources needed to continue the call in the other RAT after the handover and may include, by example, one or more frequency channels, data rate and a modulation and coding scheme. In general, the needed resources are related to a required quality of service (QoS) that was requested and/or granted to the MS/UE 10 when the call being handed over was first established. More particularly, layer 1 and layer 2 parameters are involved. Further, and as was noted above, in the direction GERAN>EUTRAN the BSS in GERAN does not determine the actual radio resources needed in EUTRAN for the call to continue (and vice-versa), bur preferably instead sets parameters that allow the other domain (e.g., GERAN, E-UTRAN) to determine the actual resources needed to continue the ongoing CS or VoIP call in the other domain.

In general, the most preferred implementations of the foregoing embodiments are those that have the least impact on pre-existing legacy procedures. Further in this regard the following points may be noted. With regard to the first embodiment (partial HO via the Gs interface), the MS 10 is expected to support a protocol stack switch between the CS and PS domains (FIGS. 3D-3G depict the various MS/UE 10 protocol stacks); the BSS 12 is implemented to have a mechanism for CS voice to VoIP resource conversion, to handle failure cases, and to enhance the handover signaling with the MSC 16; the MSC 16 and SGSN 18 are implemented to handle failure cases to operate with the enhanced signaling in accordance with the exemplary embodiments, and new signaling procedures over the Gs interface are provided for HO support. With regard to the second embodiment (resource allocation request via the Gb interface), the MS 10 is expected to support the protocol stack switch between CS and PS domains; the BSS 12 is implemented to have a mechanism for CS voice to VoIP resource conversion, to handle failure cases, and to handle the call setup and handover signaling with MSC 16, and new procedures are implemented in the Gb interface, as explained above.

Reference is made to FIGS. 4A, 4B and 4C for illustrating simplified block diagrams of various electronic devices that are suitable for use in practicing the exemplary embodiments of this invention, in particular the MS/UE 10 (FIG. 4A), the BSS/eNB 12 (FIG. 4B), and the various network nodes presented by the MSC 16, the SGSN 18 and the MME/UPE 20 (FIG. 4C). In FIG. 4A the MS/UE 10 includes a data processor (DP) 10A, a memory (MEM) 10B that stores a program (PROG) 10C, and a suitable radio frequency (RF) transceiver or transceivers 10D for bidirectional wireless communications with the BSS/eNB12. In FIG. 4B the BSS/eNB 12 each also include a DP 12A, a MEM 12B that stores a PROG 12C, and a suitable RF transceiver 12D for communication with the MS/UE 10. The BSS/eNB 12 is coupled via appropriate interfaces 12E (A, Gb, S1, X2 as appropriate) to the network node(s). In FIG. 4C each of the MSC 16, SGSN 18 and MME/UPE 20 is also assumed to include a DP 14A and a MEM 14B storing an associated PROG 14C, as well as appropriate interfaces 14D (e.g., S1, S3, Iu, Gs as the case may be). The various PROGs 10C, 12C and 14C are assumed to include program instructions that, when executed by the associated DP, enable the electronic device to operate in accordance with the exemplary embodiments of this invention, as was described above in relation to the signal and message flow diagrams of FIGS. 1A, 1B, 2A and 2B.

That is, the exemplary embodiments of this invention may be implemented at least in part by computer software executable by the DPs 10A, 12A, 14A, or by hardware, or by a combination of software and hardware.

In general, the various embodiments of the MS/UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Based on the foregoing it should be apparent that the exemplary embodiments of this invention provide a method, apparatus and computer program product(s) to perform a handover of a circuit switched call to a packet switched call.

Based on the foregoing it should be further apparent that the exemplary embodiments of this invention provide a method, apparatus and computer program product(s) to perform a handover of a packet switched call to a circuit switched call.

The method, apparatus and computer program product(s) as in the preceding two paragraphs, where the circuit switched call is established in a GERAN-enabled network, and where the packet switched call is established in an E-UTRAN-enabled network.

The method, apparatus and computer program product(s) as in the preceding paragraph, where in the GERAN-enabled network the handover is accomplished at least in part through a Gs interface between a MSC and a SGSN.

The method, apparatus and computer program product(s) as in the preceding two paragraphs, where in the GERAN-enabled network the handover is accomplished at least in part by a resource allocation request made via a Gb interface between a BSS and a SGSN.

The method, apparatus and computer program product(s) as in the preceding paragraphs, where the packet switched call is a VoIP call.

The method, apparatus and computer program product(s) as in the preceding paragraphs, comprising in the circuit switched network setting parameters allowing the other domain (packet switched network) to determine the actual resources needed to continue the ongoing VoIP call in the other domain, and communicating same towards the packet switched network.

The method, apparatus and computer program product(s) as in the preceding paragraphs, comprising in the packet switched network setting parameters allowing the other domain (circuit switched network) to determine the actual resources needed to continue the ongoing CS call in the other domain, and communicating same towards the circuit switched network.

The exemplary embodiments of this invention further provide apparatus operable in a wireless communication system that comprises means for handing over a mobile terminal circuit switched call to a packet switched call, and means for handing over a mobile terminal packet switched call to a circuit switched call. In the apparatus the circuit switched call may be established in a GERAN-enabled network, and the packet switched call may be established in an E-UTRAN-enabled network.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, message flow diagrams, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the GERAN and E-UTRAN (UTRAN-LTE) systems, it should be appreciated that at least some aspects of the exemplary embodiments of this invention are not limited for use with only these particular types of wireless communication systems, and that they may be used to advantage in other types of wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

during an ongoing call of a wireless user terminal in one of a circuit switched domain or a packet switched domain, initiating a handover procedure;

setting parameters allowing the other domain to determine the actual resources needed to continue the call in said other domain, and sending an indication of these parameters towards a network element of said other domain, wherein the parameters are related to a granted quality of service (QoS) and include data rate, modulation and coding scheme, and one or more frequency channels; and completing the handover procedure, where when the ongoing call is in the circuit switched domain completing the handover procedure results in handing over the ongoing call to the packet switched domain, and when the ongoing call is in the packet switched domain completing the handover procedure results in handing over the ongoing call to the circuit switched domain;

wherein the circuit switched domain comprises a GERAN network, and wherein the packet switched domain comprises an E-UTRAN network;

wherein in the GERAN network the handover procedure is accomplished in part by a resource allocation request made via a Gb interface between a base station system and a serving general packet radio system support node, or via a Gs interface between a mobile switching center and a serving general packet radio system support node; and wherein the handover procedure is accomplished in part by signaling conducted over an S3 interface between a serving general packet radio system support node of the GERAN network and a mobility management entity of the E-UTRAN network.

2. The method as in claim 1, wherein when the ongoing call is in the packet switched domain the ongoing call is a VoIP call.

3. The method as in claim 1 where, when the ongoing call is in the circuit switched domain, comprising determining in a base station system of the circuit switched domain those resources needed in the packet switched domain to handover the call, and communicating an indication of the determined resources towards a network element of the packet switched domain.

4. The method as in claim 1 where, when the ongoing call is in the packet switched domain, comprising determining in a Node-B of the packet switched domain those resources needed in the circuit switched domain to handover the call, and communicating an indication of the determined resources towards a network element of the circuit switched domain.

5. A non-transitory computer-readable medium that stores computer program instructions the execution of which results in operations that comprise:

during an ongoing call of a wireless user terminal in one of a circuit switched domain or a packet switched domain, initiating a handover procedure;

setting parameters allowing the other domain to determine the actual resources needed to continue the call in said other domain, and sending an indication of these parameters towards a network element of said other domain, wherein the parameters are related to a granted quality of service (QoS) and include data rate, modulation and coding scheme, and one or more frequency channels; and completing the handover procedure, wherein when the ongoing call is in the circuit switched domain completing the handover procedure results in handing over the ongoing call to the packet switched domain, and when the ongoing call is in the packet switched domain completing the handover procedure results in handing over the ongoing call to the circuit switched domain;

wherein the circuit switched domain comprises a GERAN network, and wherein the packet switched domain comprises an E-UTRAN network;

wherein in the GERAN network the handover procedure is accomplished in part by a resource allocation request made via a Gb interface between a base station system and a serving general packet radio system support node, or via a Gs interface between a mobile switching center and a serving general packet radio system support node; and wherein the handover procedure is accomplished in part by signaling conducted over an S3 interface between a serving general packet radio system support node of the GERAN network and a mobility management entity of the E-UTRAN network.

6. The non-transitory computer-readable medium of claim 5, wherein when the ongoing call is in the packet switched domain the ongoing call is a VoIP call.

7. The non-transitory computer-readable medium of claim 5 where, when the ongoing call is in the circuit switched domain, comprising determining in a base station system of the circuit switched domain those resources needed in the packet switched domain to handover the call, and communicating an indication of the determined resources towards a network element of the packet switched domain.

8. The non-transitory computer-readable medium of claim 5 where, when the ongoing call is in the packet switched domain, comprising determining in a Node-B of the packet switched domain those resources needed in the circuit switched domain to handover the call, and communicating an indication of the determined resources towards a network element of the circuit switched domain.

9. An apparatus, comprising:

a controller configurable for operation during an ongoing call of a wireless user terminal in one of a circuit switched domain or a packet switched domain to initiate a handover procedure and to determine resources needed to continue the call in the other domain; to set parameters allowing the other domain to determine the actual resources needed to continue the call in said other domain;

and an interface configurable to send an indication of these parameters towards a network element of said other domain, wherein the parameters are related to a granted quality of service (QoS) and include data rate, modulation and coding scheme, and one or more frequency channels;

wherein when the ongoing call is in the circuit switched domain completing the handover procedure results in handing over the ongoing call to the packet switched domain, and when the ongoing call is in the packet switched domain completing the handover procedure results in handing over the ongoing call to the circuit switched domain;

wherein the circuit switched domain comprises a GERAN network, and wherein the packet switched domain comprises an E-UTRAN network;

wherein in the GERAN network the handover procedure is accomplished in part by a resource allocation request made via a Gb interface between a base station system and a serving general packet radio system support node, or via a Gs interface between a mobile switching center and a serving general packet radio system support node; and wherein the handover procedure is accomplished in part by signaling conducted over an S3 interface between a serving general packet radio system support node of the GERAN network and a mobility management entity of the E-UTRAN network.

10. The apparatus of claim 9, wherein when the ongoing call is in the packet switched domain the ongoing call is a VoIP call.

11. The apparatus of claim 9 embodied in a base station system of the circuit switched domain, and wherein said controller is further configurable to determine those resources needed in the packet switched domain to handover the call, and to communicate an indication of the determined resources towards a network element of the packet switched domain.

12. The apparatus of claim 9 embodied in a Node-B of the packet switched domain, and wherein said controller is further configurable to determine those resources needed in the circuit switched domain to handover the call, and to communicate an indication of the determined resources towards a network element of the circuit switched domain.

* * * * *